June 12, 1923.
G. TERZAGHI
SEMIELLIPTICAL SPRING
Filed Jan. 5, 1922
1,458,786
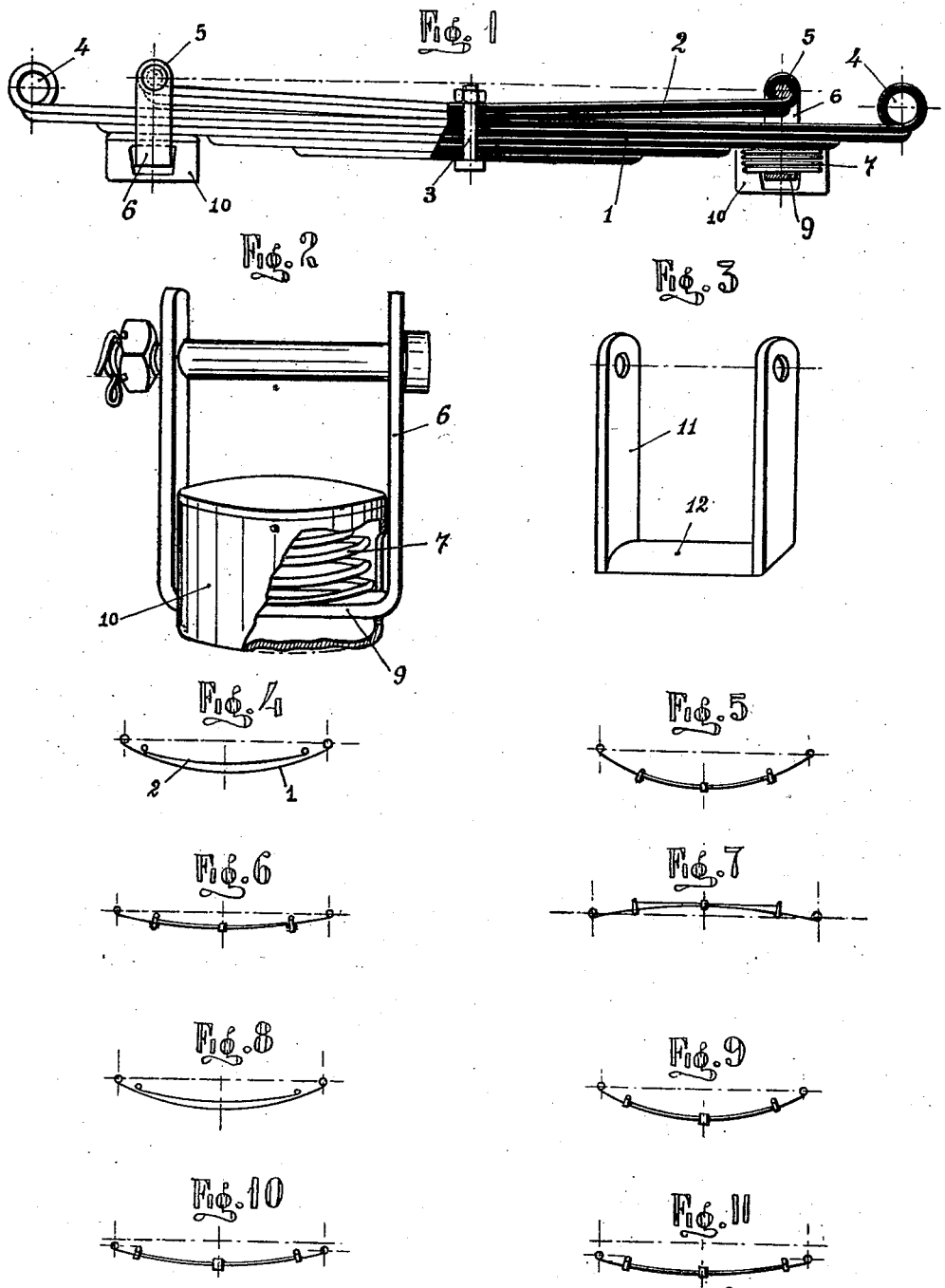

Patented June 12, 1923.

1,458,786

UNITED STATES PATENT OFFICE.

GIULIO TERZAGHI, OF TURIN, ITALY.

SEMIELLIPTICAL SPRING.

Application filed January 5, 1922. Serial No. 527,252.

*To all whom it may concern:*

Be it known that I, GIULIO TERZAGHI, a subject of the King of Italy, and resident of 21 via Mondovi, Turin, in the Kingdom of Italy, have invented certain new and useful Improvements in Semielliptical Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

A vehicle spring would be perfect if its flexure (namely the increase of the radius of curvature in millimeters per unit of load) and the intensity of stress in its material were kept constant.

It is well known that, when a vehicle is running to the static load of the spring (that can be easily predetermined) a dynamic load is added, that varies continually within wide limits owing to different causes (for instance unevenness of the road, speed, load conditions of the vehicle, etc.) and may attain instantaneous values exceeding that of the statical load, that can be foreseen but not calculated beforehand.

A perfectly working spring as above set forth cannot therefore be realized, as it ought to change continually its form to fit the stress conditions of each instant.

This invention has for its object to provide a semi-elliptical spring working approximatively under the conditions of the above "ideal" spring. It consists of several parts connected with each other in such a way as to successively and automatically absorb the load when this latter increases. The load on the spring is therefore fractionated and the different spring parts come under stress when required by the load.

The parts of the spring have different radii of curvature and are connected in such a way as to lie close to each other.

Owing to this arrangement the parts of the spring are submitted to an initial stress and sudden shocks are prevented during the working of the spring.

Further, should the carrier plate of the main part break near the central bolt, this would entail no serious accident, as generally happens with other kinds of springs, as the plate would still work as a solid secured at one end, and therefore the running of the vehicle would not be prevented.

In the accompanying drawings;

Fig. 1 is a side elevation partly in section of a spring embodying the invention and under middle load, that is when its upper auxiliary part is coming into action.

Fig. 2 shows a detail of the connecting member between the two parts forming the spring.

Fig. 3 is a like view of a modified form of the connecting member.

Figs. 4, 5, 6, 7 are diagrams showing the mounting and working of the spring shown in Fig. 1.

Figs. 8, 9, 10, 11 are similar diagrams referring to another constructional form having non-elastic connecting members of the type shown in Fig. 3.

Referring to Figs. 1, 2, 4, 5, 6, 7 of the drawings:

1 designates the main lower part of the spring and 2 the upper auxiliary part having a greater radius of curvature and centrally connected with the main part through a bolt 3 or other suitable connecting system.

Each part of the spring comprises a number of plates of different length and section according to the load to be absorbed by the spring.

The longer main part 1, is connected in the usual way by means of eyes 4 to the carriage frame, and the ends of the upper part 2 are connected with the part 1 by means of straps 6 pivoted to eyes 5.

Between a bridge piece 9 of said straps and the lower face of the part 1 is situated a spiral spring 7 conveniently provided with a protecting box 10.

The mounting and working of this spring are diagrammatically shown in Figs. 4 to 11. In Fig. 4 the two parts 1 and 2 having a different radius of curvature are shown detached from one another. Said parts are centrally connected with each other as shown in Fig. 5, where the spring is mounted and unloaded. When the spring is loaded in a first stage thus bringing the load from a zero value (Fig. 5) to a determined value that will be referred to as Q (Fig. 6), only the lower part 1 comes under stress owing to the usual fastening devices while the upper part 2 (having a greater radius of curvature) follows the flexure of the former remaining close to it.

In the second stage the stress still acts only on the lower part, but, this latter, resting laterally on the spiral springs 7, gradually throws into action the upper part 2 by means of straps 6.

In the third stage, when a determined value $Q^1$ of the load is attained, the upper part 2 (Fig. 7) comes under stress.

On the contrary, when springing back, the upper part 2, owing to its curvature, prevents a sudden return of the lower part 1 to its original position, and assists in damping the vibrations.

The stress of the material (in pounds per inch$^2$) of the lower part does not increase in proportion to the increase of the load beyond the value $Q^1$, as by increasing of the load the upper part 2 comes gradually into action. It is thus impossible to exceed frequently certain limits of unitary load nonpermissible in view of the life of material while a nearly uniform elasticity of the spring is maintained.

Owing to the above arrangement the number of plates of a semielliptical spring can be increased without considerably altering its elasticity thus ensuring a perfect working.

Fig. 3 shows a modified form of the strap, referred to as 11, adapted to connect the parts 1 and 2, the spiral spring being omitted. The bridge 12 of said strap has a curvilinear shape in order to facilitate the rotation of said straps about the axis of the connecting pin.

Figs. 8 to 11 show diagrammatically the mounting and working of the spring provided with straps 11 similar to those of the first constructional form shown in Figs. 4 to 7.

Each part is conveniently formed with the greatest possible number of thin plates and the number of the parts can be varied without departing from the scope of my present invention.

Claims:

1. A semi-elliptical spring, comprising a main spring adapted to directly support the load, an auxiliary spring having a greater radius of curvature than the main spring and rigidly connected at its center to the center of the main spring, and means to resiliently connect the free ends of the auxiliary spring to the main spring.

2. A semi-elliptical spring, comprising a main spring adapted to directly support the load, an auxiliary spring having a greater radius of curvature than the main spring, means rigidly connecting the springs together at their centers, U-shaped straps pivotally connected to the free ends of the auxiliary spring and extending beneath the main spring, and shock absorbers interposed between the straps and under side of the main spring.

In testimony that I claim the foregoing as my invention, I have signed my name.

GIULIO TERZAGHI.